United States Patent [19]
Sullivan, Jr.

[11] Patent Number: 5,914,036
[45] Date of Patent: Jun. 22, 1999

[54] PAINT STRAINER

[76] Inventor: Joseph J. Sullivan, Jr., 114 Mann Hill Rd., Scituate, Mass. 02066

[21] Appl. No.: 08/956,726

[22] Filed: Oct. 23, 1997

[51] Int. Cl.⁶ .................................................. B01D 29/05
[52] U.S. Cl. .......................... 210/232; 210/474; 210/482; 210/238
[58] Field of Search ................... 210/238, 474, 210/482, 232

[56] References Cited

U.S. PATENT DOCUMENTS

| | | |
|---|---|---|
| D. 362,804 | 10/1995 | Warren ...................... D9/436 |
| 1,051,735 | 1/1913 | Hammond . |
| 1,994,335 | 3/1935 | Churan ...................... 229/90 |
| 2,070,998 | 2/1937 | Odom . |
| 2,239,132 | 4/1941 | Ware ...................... 210/155 |
| 2,250,646 | 7/1941 | Metsch . |
| 2,315,842 | 4/1943 | Dariano ...................... 210/158 |
| 2,436,924 | 3/1948 | Hansen ...................... 211/65 |
| 2,667,976 | 2/1954 | Weidner . |
| 2,883,057 | 4/1959 | Richards . |
| 3,263,817 | 8/1966 | Buckley . |
| 4,025,435 | 5/1977 | Shea ...................... 210/250 |
| 4,066,557 | 1/1978 | Banoczi ...................... 210/470 |
| 4,290,888 | 9/1981 | Gartmann . |
| 4,362,624 | 12/1982 | Ueda ...................... 210/497.2 |
| 4,622,146 | 11/1986 | O'Brien . |
| 4,731,177 | 3/1988 | Hemman . |
| 4,804,470 | 2/1989 | Calvillo et al. ...................... 210/232 |
| 4,816,148 | 3/1989 | Hemman . |
| 5,368,728 | 11/1994 | Reaves ...................... 210/232 |

FOREIGN PATENT DOCUMENTS 21929  11/1914  United Kingdom .

*Primary Examiner*—Thomas M. Lithgow
*Attorney, Agent, or Firm*—Pandiscio & Pandiscio

[57] ABSTRACT

A strainer device for use in straining a liquid such as paint from a container into an open receptacle, said strainer device having a side wall with a top end and a bottom end, an outwardly and circumferentially extending lip that is integral with the side wall at said top end and is adapted to be engageable with the top end of an open top container so as to support the strainer device in the open top of the container and a screen mesh member fixed to a flange on the bottom end of said side wall.

10 Claims, 2 Drawing Sheets

PAINT STRAINER

BACKGROUND OF THE INVENTION

1. Field of the Invention

The present invention relates to paint strainers, and is directed more particularly to paint strainers for use in conjunction with paint containers.

2. Description of the Prior Art

Paint strainers used in conjunction with paint containers generally are known in the art. Currently available to the paint industry are filter socks, filters affixed to cardboard, and filters affixed to paper funnels.

Filter socks often are made from a synthetic fiber, such as nylon or polyester, and sewn in such a way as to create a sock. The socks are considered cumbersome to work with because they need to be manually stretched over a receptacle, i.e., a can or bucket, into which paint is to be poured from another can or bucket of paint. Once the sock has been pulled over the receptacle, the paint is then poured out of the can or bucket through the sock into the receptacle. In the case of a 5 gallon can or bucket of paint, this requires the operator to use one hand to hold the sock on the receptacle, leaving only one hand to pour 5 gallons, or approximately 50 lbs., of paint into the receptacle. For most people this is at best a task that is difficult and messy. It is difficult to control the flow of paint and have it filter directly into the waiting container. Paint frequently sprays out the sides of the sock and ends up becoming a messy proposition.

The second option available to the paint industry is a filter material that has been affixed to a cardboard box. This unit is designed to sit on top of an empty container and allow paint from another container to be poured through the filter unit. Although this design solves the handling problem with the aforementioned sock, it has its drawbacks as well. The fact that it uses cardboard as one of its major components raises serious contamination issues and also increases costs. Many painters do not want their paint coming in contact with cardboard for fear of dust and dirt related problems. Also, the filter material is often stapled to the cardboard which does not provide a very reliable bond and, furthermore, does not create a uniform seal around the diameter of the cardboard box. This allows for the possibility that paint can be poured between the filter and the cardboard, thus by-passing the filtering process altogether. Lastly, although the base of this type of filtering apparatus sits on the lip of a container, the cardboard box extends well up above the height of the container it is sitting on. This results in a potentially unstable position; it may tip over if not filled properly.

U.S. Pat. No. 4,804,470, issued Feb. 14, 1989 to Carlos P. Calvillo et al., relates to a box-shaped strainer body adapted to be mounted on top of a paint container. A strainer bag is fixed in the body and intercepts and holds paint lumps as paint is poured through the body and into the container. In U.S. Pat. No. 5,368,728, issued Nov. 29, 1994 to Paul H. Reaves, there is disclosed a strainer similar to the Calvillo strainer.

The third available option is a paper funnel that is combined with a filter material. One of the problems with this design is that it is not self-supporting and, therefore, has to be hand-held to be used. This makes it difficult to simultaneously hold the filter and pour material. In addition, the possibility exists for the entire filter apparatus to accidentally fall into the strained material, defeating the purpose entirely. Also, because the unit is hand-held, its capacity is necessarily limited, limiting the rate and efficiency of the straining process. Particularly with larger volumes of paint to be strained, this method is considered impractical.

In U.S. Pat. No. 4,622,146, issued Nov. 11, 1986 to Robert O'Brien, there is disclosed a funnel-shaped sleeve with a mesh disk near the small end of the sleeve, the mesh disc serving as a strainer for paint disposed in the funnel-shaped sleeve.

In U.S. Pat. No. 4,066,557, issued Jan. 3, 1978 to Joseph A. Banoczi, there is shown and described a circular mesh strainer which is pushed through a container of paint, surface to bottom, carrying with it any lumps which collect between the mesh and the bottom of the container. To the knowledge of the inventor herein, this approach is not in use in the industry.

With the exception of the strainer shown in O'Brien U.S. Pat. No. 4,622,146, none of the above-described prior art strainers is adapted for stacking one inside the other, such that a number of strainers can be stored or shipped in a small area. While some strainers are said to be reusable, in practice most strainers are used only for one paint color and then replaced rather than risk discoloration of a second color with left-over traces of the first color. Accordingly, storage space is required for a goodly number of strainers.

Further, it is advantageous to be able to engage the strainer with the paint container so that both hands of a painter may be used to pour the paint through the strainer and into the paint container. In the case of the Calvillo et al and Reaves designs, the strainer body is rested on the paint container, but the strainer is set on top of the paint container, providing a top-heavy assembly. Instability in the assembly is not helpful during a paint-pouring operation.

Accordingly, it is deemed beneficial to provide a paint strainer which is stackable and which in use may be engaged with the top of a container or other receptacle, so that an operator can devote both hands to the pouring operation, while the strainer is allowed to hang in the paint container, thus serving to strain paint poured into the container, while not raising the center of gravity of the container, or otherwise contributing to instability of the paint strainer alone or in relation to the receptacle.

It is further deemed advantageous to provide such a strainer as is easily and inexpensively made, and therefore readily disposable and replaceable without significant cost.

SUMMARY OF THE INVENTION

A primary object of this invention is to provide a strainer for paints and other liquid materials that is easily and inexpensively made and is readily disposable and/or replaceable without substantial cost.

Another object of the invention is to provide a strainer which is readily stackable and therefore subject to space efficient shipping and storage.

A further object of the invention is to provide a strainer, for paints or other liquid materials, which may be disposed so as to engage an open end of a liquid container and extend into the container from the open end thereof, freeing the hands of an operator for a pouring operation, whereby the paint or other liquid material is strained as it passes through the strainer into the receptacle.

With the above and other objects in view, as will hereinafter appear, the present invention comprises the provision of a novel strainer adapted particularly for straining and depositing liquid paint in an open container, but useful also in straining other liquid material. In the illustrated embodiment of the invention, the strainer includes a frusto-conically shaped side wall terminating in a top end and a bottom end, an outwardly-extending lip or flange formed integral with the strainer side wall at the top end, the lip being engageable with the top end of the receptacle so as to support the strainer in the top end of the container, an inwardly-extending lip or flange formed integral with the bottom end of the strainer side wall, and a screen or mesh fixed to the inwardly-extending lip at the bottom end of the strainer side wall so as to close off the bottom end of said strainer.

In accordance with a further feature of the invention, the strainer is adapted to be readily stackable with other strainers of substantially the same size and configuration and the same or different mesh.

In accordance with a still further feature of the invention, the strainer side wall is made of a first thermoplastic material and the strainer mesh is made of a second thermoplastic material, the first and second thermoplastic materials being joined together by fusion or other bonding means or methods.

The above and other features of the invention, including various novel details of construction and combinations of parts, will now be more particularly described with reference to the accompanying drawings and pointed out in the claims. It will be understood that the particular device embodying the invention is shown by way of illustration only and not as a limitation of the invention. The principles and features of this invention may be employed in various and numerous embodiments without departing from the scope of the invention.

BRIEF DESCRIPTION OF THE DRAWINGS

Reference is made to the accompanying drawings in which is shown an illustrative embodiment of the invention, from which its novel features and advantages will be apparent.

In the drawings.

DESCRIPTION OF THE PREFERRED EMBODIMENTS

Figure 1:
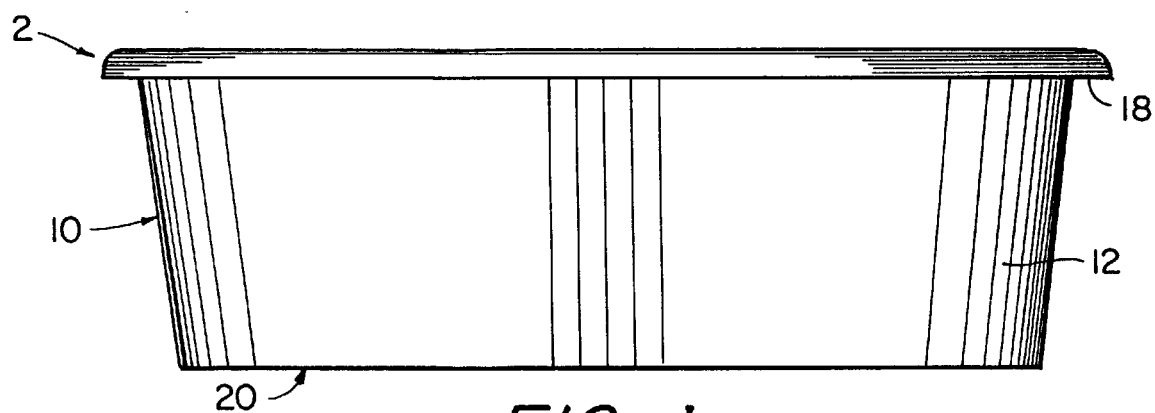
FIG. 1 is a side elevational view of one form of paint strainer illustrative of an embodiment of the invention.
Figure 2:
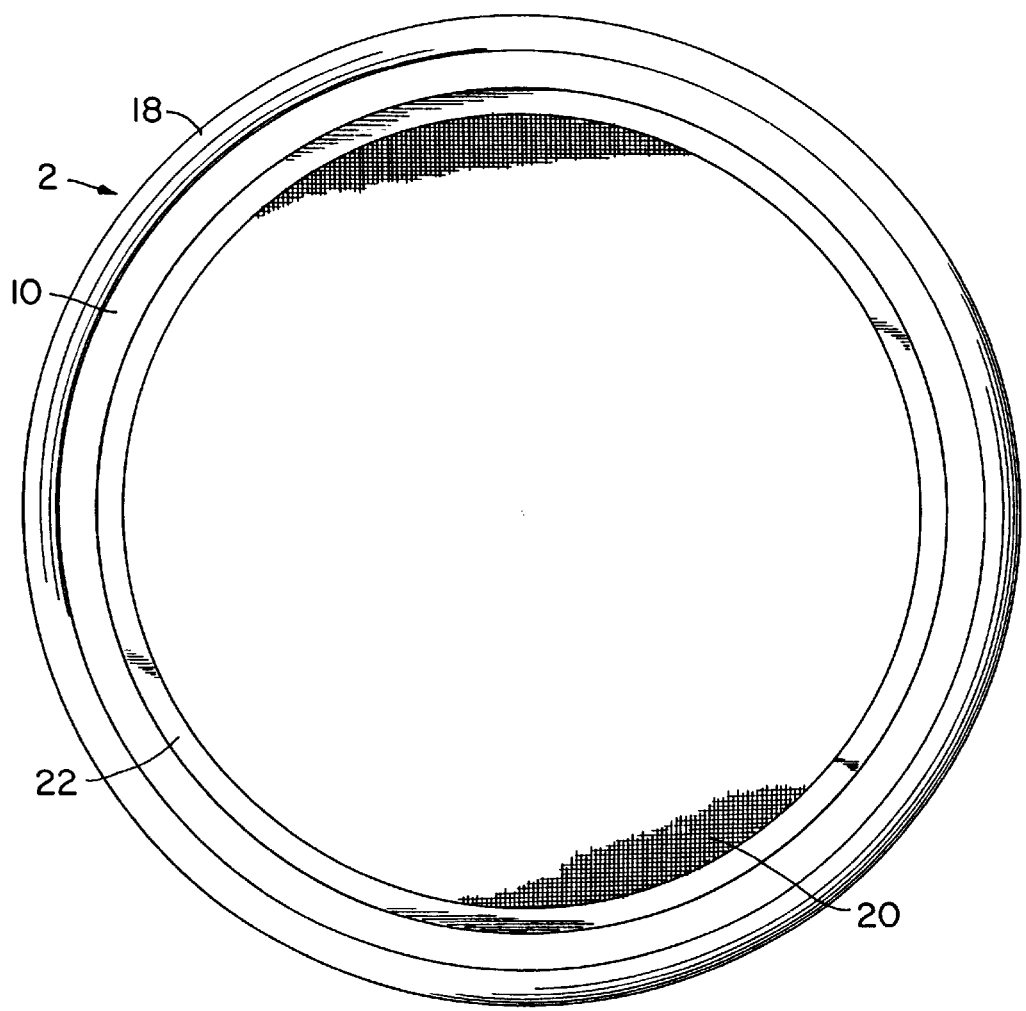
FIG. 2 is a top plan view of the strainer of FIG. 1.
Figure 3:
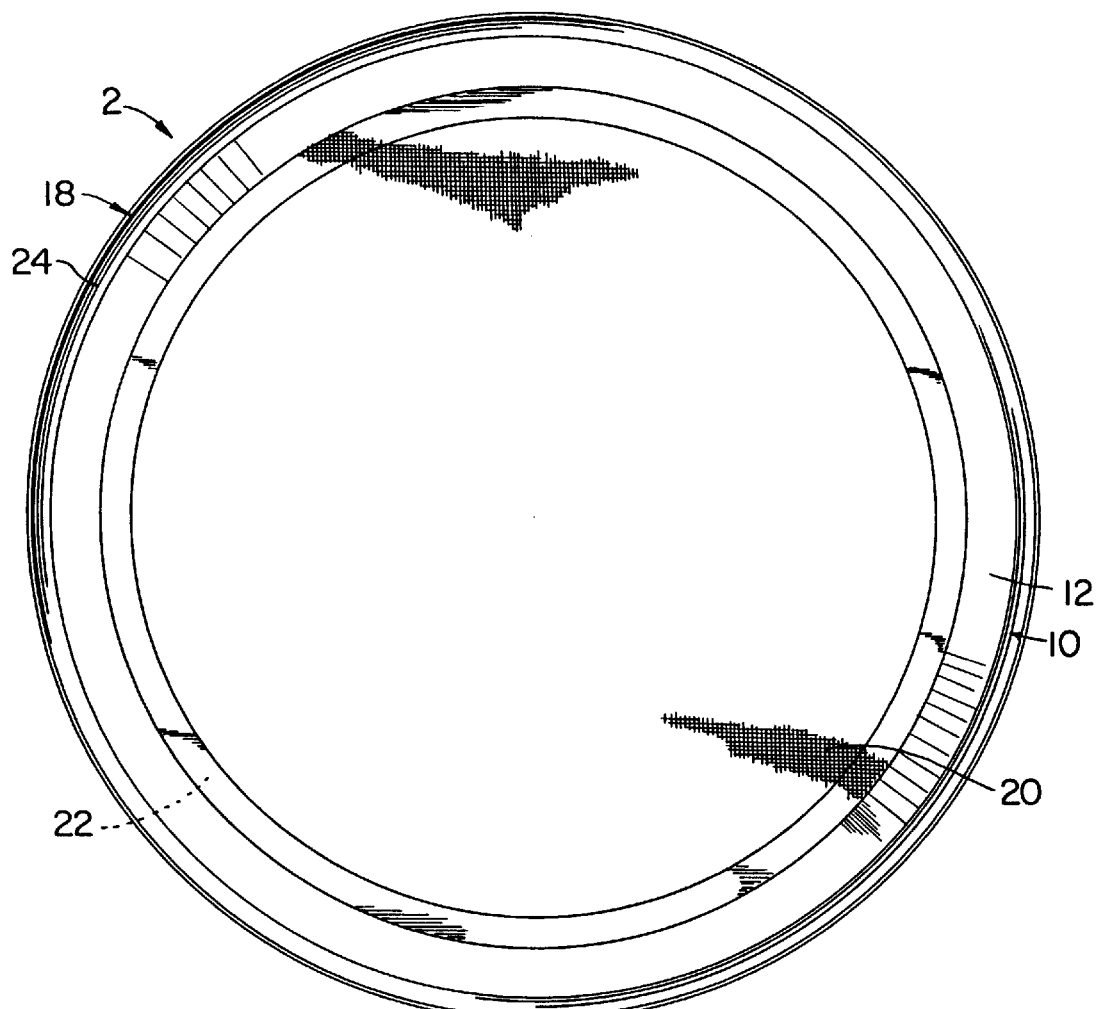
FIG. 3 is a bottom view of the strainer of FIG. 1.

Referring to the drawings, it will be seen that the illustrative paint strainer 2 comprises a body portion 10 and a strainer member or mesh 20. The body portion 10 includes a frusto-conically shaped side wall 12. Integral with the top end of side wall 12 is an outwardly and circumferentially extending lip or flange 18 which defines the top end of the strainer and which is engageable with a container top edge (not shown) to support the strainer, which hangs in the container from the container top edge. Integral with the bottom end of side wall 12 is an inwardly and circumferentially-extending flange 22, preferably about ¼–½ inch wide. In manufacture, the side wall 12, lip 18 and flange 22 are molded integrally as a one-piece unit.

The body portion 10 is molded of a first thermoplastic material, such as polyethylene or polypropylene, preferably polyethylene, and the strainer member 20 is made of a second thermoplastic material, preferably nylon. The height of the side wall 12 preferably is sufficiently short so as not to protrude into the container beneath the surface of the paint that is being strained into the container, but preferably is sufficiently tall so as to hold as much paint as possible, whereby to minimize pouring time. A height of about 3½ inches has been found appropriate. Preferably the body portion 10 is made by vacuum molding.

The strainer member or mesh 20 is a circularly shaped element that preferably is produced by first providing a sheet or web of a mesh material, and then die-cutting the sheet or web to form the circularly-shaped element. The strainer member 20 is heat bonded to the inwardly-extending flange 22, causing molten polyethylene to fuse and interengage the nylon strands of the mesh 20, so as to bond the mesh 20 and flange 22 securely together. Alternatively, strainer member 20 may be fixed to flange 22 by a suitable cement, i.e., a bonding agent.

In a preferred bonding operation, a heater die is set at about 275° F. and is applied to the mesh 20 which is disposed on the flange 22. This temperature has no adverse effect on the nylon mesh, but melts the polyethylene. The peripheral portion of the nylon mesh is pressed against the polyethylene flange 22 which is in part molten, or at least softened, so that the mesh 20 is infiltrated by the polyethylene, with the result that upon cooling the mesh is embedded in the flange 22 so as to produce a securely interlocked mesh 20 and flange 22. Thus, two materials normally considered non-compatible are strongly interlocked to provide a strainer of high structural integrity. Such bonding permits the use of a high-quality and relatively expensive mesh 20 in conjunction with a much less expensive material, such as polyethylene. The finished product is much more competitive, cost-wise, than if the entire strainer were made of premium material, such as nylon or a polyester.

As may be seen in the drawings, the side wall 12 is frusto-conically shaped, with the inside and outside diameters of the top end of wall 12 exceeding the corresponding diameters of the bottom end of wall 12 (exclusive of flange 22). It will be apparent that strainer member 20 is a substantially planar member, but it may bow somewhat under the weight and force of paint or other liquid that is poured into the strainer, depending upon the viscosity of the paint or other liquid.

The strainer is designed to be used to strain a liquid by pouring that liquid from one container into another container or receptacle via the strainer.

Figure 4:
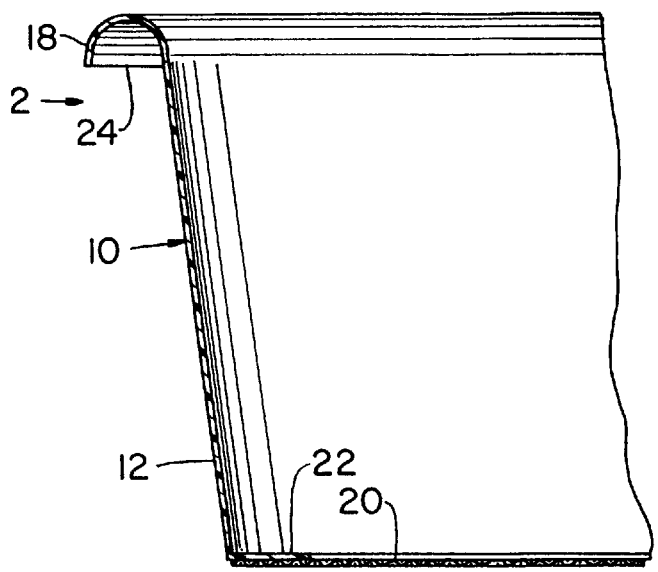
FIG. 4 is a partial cross-sectional view taken of the same strainer.
Figure 5:
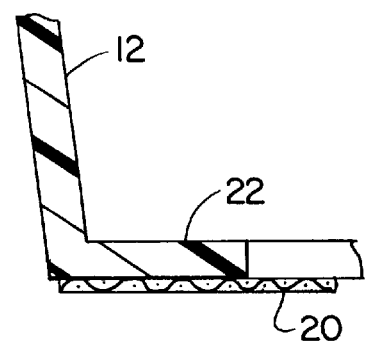
FIG. 5 is an enlarged view of a portion of FIG. 4.

In operation, lip 18 of the strainer 2 is fitted over the top edge of a container or receptacle (not shown), typically an empty one gallon or five gallon can or pail, having an annular top edge. The outwardly-extending lip 18 defines an annular groove 24 (FIG. 4) which receives the annular top edge of the container. Once lip 18 is engaged with the container top edge, the body 10 extends down into the container, and thereafter the hands of the operator are free to handle the pouring operation. Inasmuch as only a minor portion of the strainer lip 18 is above the top edge of the paint receptacle, the center of gravity of the strainer is below the top end of the receptacle into which paint is being strained, thereby reducing the risk of accidentally dislodging the strainer from the receptacle with a resultant spillage of paint. It should be noted also that the combined mass of the container and strainer is substantially the same as that of the container alone, thereby reducing the risk of either the strainer and/or receptacle being tipped over accidentally.

It will be apparent that the strainer 2 is sized according to the size of the container or receptacle into which paint or other liquid is to be poured with filtering via the strainer. Making the side wall 12 of the body portion 10 with a frusto-conical shape makes it possible for one strainer to receive another strainer of the same size and configuration, whereby a large number of strainers may be stacked, i.e., nested together, in a relatively small volume. It is contemplated that strainers having screens of different size mesh may be nested together and packaged and sold as a discrete set, thereby offering the user a choice of mesh porosity.

While the invention has been described particularly for use as a strainer for paint, it is obvious that the strainer may be used to strain other liquids. There is thus provided a strainer of extremely low cost in materials and manufacturing requirements, thereby rendering replacement thereof economically favorable.

It is to be understood that the present invention is by no means limited to the particular construction herein disclosed and/or shown in the drawings, but also comprises any modifications or equivalents within the scope of the claims.

What is claimed is:

1. A strainer device for use in straining and depositing paint or other liquid in an open container having a top edge, said strainer comprising:

a body member made of a first thermoplastic material and characterized by a tubular side wall with a top end and a bottom end, an outwardly-extending lip integral with said side wall at said top end, said lip forming an open channel and being adapted to extend over and engage the top edge of an open container, so that said strainer device may be supported by said container with the bottom end of said body member extending into said container, and an inwardly-extending flange formed integral with the bottom end of said side wall; and a substantially flat strainer member comprising a thermoplastic mesh material extending across the opening defined by said side wall at said bottom end thereof, said thermoplastic mesh material overlapping and being fusion bonded directly to said inwardly-extending flange.

2. A strainer device in accordance with claim 1 wherein said tubular side wall has a frusto-conical shape in side elevation, with the inside diameter of said side wall at said top end exceeding the inside diameter of said side wall at said bottom end.

3. A strainer device in accordance with claim 1 wherein said strainer member consists of a nylon mesh.

4. A strainer device in accordance with claim 1 wherein said strainer body member is made of polyethylene or polypropylene.

5. A strainer device in accordance with claim 4 wherein said strainer member consists of a nylon mesh.

6. A strainer in accordance with claim 5 wherein said strainer member is fixed to said inwardly-extending flange by a heat fusion bond.

7. A strainer device in accordance with claim 1 wherein said outwardly-extending lip is curved in cross-section so as to be able to extend over and engage the top end of an open container, whereby to support said strainer device on the upper end of said container.

8. A strainer device in accordance with claim 1 wherein said strainer member underlies said inwardly-extending flange.

9. A strainer in accordance with claim 1 wherein said strainer member is fixed to said inwardly-extending flange by a heat fusion bond.

10. A strainer device in accordance with claim 1 wherein said strainer member is embedded in said flange by said heat fusion bond.

* * * * *

UNITED STATES PATENT AND TRADEMARK OFFICE
CERTIFICATE OF CORRECTION

PATENT NO.   : 5,914,036
DATED        : June 22, 1999
INVENTOR(S)  : Joseph J. Sullivan, Jr.

It is certified that error appears in the above-indentified patent and that said Letters Patent is hereby corrected as shown below:

Claim 10, column 6, line 31, the numeral "1" should be changed to -- 9 --.

Signed and Sealed this

Twenty-sixth Day of October, 1999

Attest:

Q. TODD DICKINSON

Attesting Officer

Acting Commissioner of Patents and Trademarks